US011409655B2

(12) United States Patent
Ito (10) Patent No.: US 11,409,655 B2
(45) Date of Patent: Aug. 9, 2022

(54) INTERFACE APPARATUS, DATA PROCESSING APPARATUS, CACHE CONTROL METHOD, AND MEDIUM

(71) Applicant: CANON KABUSHIKI KAISHA, Tokyo (JP)

(72) Inventor: Tadayuki Ito, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 2 days.

(21) Appl. No.: 16/799,061

(22) Filed: Feb. 24, 2020

(65) Prior Publication Data

US 2020/0278929 A1    Sep. 3, 2020

(30) Foreign Application Priority Data

Mar. 1, 2019   (JP) .............................. JP2019-037772
Feb. 13, 2020  (JP) .............................. JP2020-022672

(51) Int. Cl.
*G06F 12/084*  (2016.01)
*G06F 12/0804* (2016.01)
*G06F 12/0875* (2016.01)
*G06F 12/0891* (2016.01)

(52) U.S. Cl.
CPC ........ *G06F 12/0804* (2013.01); *G06F 12/084* (2013.01); *G06F 12/0875* (2013.01); *G06F 12/0891* (2013.01); *G06F 2212/455* (2013.01); *G06F 2212/62* (2013.01)

(58) Field of Classification Search
CPC .............. G06F 12/0804; G06F 12/084; G06F 12/0875; G06F 12/0891; G06F 2212/455; G06F 2212/62; G06F 12/0842; G06F 2212/1016; G06F 2212/1028; Y02D 10/00

USPC ......................................................... 711/105
See application file for complete search history.

(56) References Cited

U.S. PATENT DOCUMENTS

| 6,263,409 | B1 * | 7/2001 | Haupt ................. G06F 13/1626 710/39 |
| 2001/0008009 | A1 * | 7/2001 | Johnson .............. G06F 12/0864 711/128 |
| 2004/0128456 | A1 * | 7/2004 | Kobayashi ............. G06F 3/067 711/162 |
| 2006/0061600 | A1 * | 3/2006 | Beuker ................. G09G 5/363 345/656 |
| 2008/0256306 | A1 * | 10/2008 | Warner ............... G06F 12/0831 711/152 |
| 2013/0159632 | A1 * | 6/2013 | Caparros Cabezas ....... G06F 12/0835 711/143 |

(Continued)

FOREIGN PATENT DOCUMENTS

JP          2012043031 A         3/2012

*Primary Examiner* — Hashem Farrokh
(74) *Attorney, Agent, or Firm* — Rossi, Kimms & McDowell LLP (57) ABSTRACT

There is provided with an interface apparatus. The interface apparatus provides a shared cache for a plurality of processing units. A first port acquires data from a first processing unit included in the plurality of processing units. A second port outputs the data acquired from the first processing unit to a second processing unit included in the plurality of processing units. A cache caches the data acquired from the first processing unit. A controller controls, based on information acquired from the second processing unit, whether to write back data written in the cache to a memory different from the cache.

20 Claims, 6 Drawing Sheets

(56) References Cited

U.S. PATENT DOCUMENTS

2020/0104195 A1\* 4/2020 Sanghi .................... G06F 9/544

\* cited by examiner

INTERFACE APPARATUS, DATA PROCESSING APPARATUS, CACHE CONTROL METHOD, AND MEDIUM

BACKGROUND OF THE INVENTION

Field of the Invention

The present invention relates to an interface apparatus, a data processing apparatus, a cache control method, and a medium, and particularly to a shared cache memory.

Description of the Related Art

In recent years, it is necessary to implement various functions in one product. For example, there is known a method of implementing various functions in a product including a plurality of data processing units by using the data processing units in combination in accordance with an application.

In this arrangement, it is possible to increase a process speed by improving the efficiency of data transfer between the data processing units. For example, Japanese Patent Laid-Open No. 2012-43031 discloses a method of connecting two processors via a shared cache memory device. In the method disclosed in Japanese Patent Laid-Open No. 2012-43031, the shared cache memory device monitors write of data by the first processor, and transfers, if data requested by the second processor is written, the data to the second processor.

SUMMARY OF THE INVENTION

According to an embodiment of the present invention, an interface apparatus configured to provide a shared cache for a plurality of processing units comprises: a first port configured to acquire data from a first processing unit included in the plurality of processing units; a second port configured to output the data acquired from the first processing unit to a second processing unit included in the plurality of processing units; a cache configured to cache the data acquired from the first processing unit; and a controller configured to control, based on information acquired from the second processing unit, whether to write back data written in the cache to a memory different from the cache.

According to another embodiment of the present invention, a caching control method, at an interface apparatus, for providing a shared cache for a plurality of processing units, wherein the interface apparatus comprises a first port configured to acquire data from a first processing unit included in the plurality of processing units, a second port configured to output the data acquired from the first processing unit to a second processing unit included in the plurality of processing units, and a cache configured to cache the data acquired from the first processing unit, comprises: controlling, based on information acquired from the second processing unit, whether to write back data written in the cache to a memory different from the cache.

According to still another embodiment of the present invention, a non-transitory computer-readable medium stores a program which, when executed by a computer, which comprises a processor and a memory, of an interface apparatus, which is configured to provide a shared cache for a plurality of processing units and comprises a first port configured to acquire data from a first processing unit included in the plurality of processing units, a second port configured to output the data acquired from the first processing unit to a second processing unit included in the plurality of processing units, and a cache configured to cache the data acquired from the first processing unit, causes the computer to: control, based on information acquired from the second processing unit, whether to write back data written in the cache to a memory different from the cache.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Data processing units are manufactured in accordance with various concepts, and manufactured by various makers. Therefore, specifications or constraints of data processes of the respective data processing units, such as the process units of data processes, are often different from each other. In many cases, an apparatus that connects a precedent data processing unit and a subsequent data processing unit cannot transfer data received from the precedent data processing unit to the subsequent data processing unit immediately. Thus, it is necessary to at least temporarily store data received from the precedent data processing unit in some storage unit. This process requires an additional circuit or an additional process load.

An embodiment of the present invention can improve the efficiency of a data transfer process from one processing unit to the other processing unit in an interface apparatus that connects the processing units.

First Embodiment (Example of Arrangement of Data Processing Apparatus)

Figure 1:
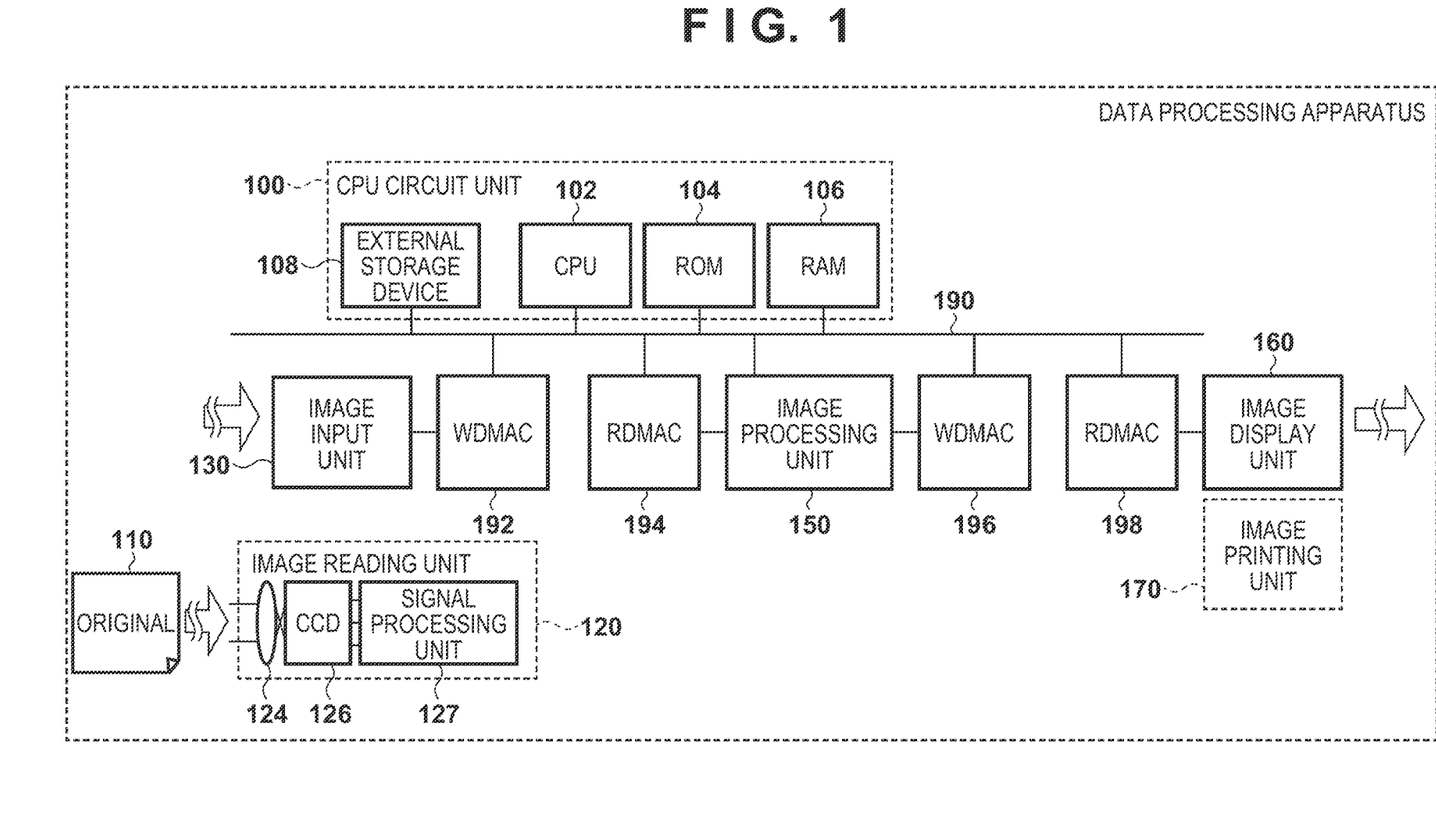
FIG. 1 is a block diagram showing an example of the arrangement of a data processing apparatus according to an embodiment.

FIG. 1 is a block diagram showing an example of the arrangement of a data processing apparatus to which an interface apparatus is applicable according to the first embodiment. Although a processing target of the data processing apparatus is not particularly limited, FIG. 1 shows an image processing apparatus that performs an image process for image data. The data processing apparatus shown in FIG. 1 includes a CPU circuit unit 100, an image reading unit 120, an image input unit 130, an image processing unit 150, and an image display unit 160.

The image reading unit 120 includes a lens 124, a CCD sensor 126, and a signal processing unit 127. An image of an original 110 is formed on the CCD sensor 126 via the lens 124. Then, the CCD sensor 126 generates analog electrical signals representing the image. The signal processing unit 127 performs a correction process for each of R, G, and B, and also performs analog-to-digital conversion, thereby generating full-color digital image signals (pixel values). The thus generated digital image signals are input to the image input unit 130. A set of digital image signals (pixel values) with respect to a plurality of pixels included in one image will be referred to as image data hereinafter.

The image processing unit 150 performs an image process for the image data input to the image input unit 130. Examples of the image process are a process of compensating for the individual difference of a sensor element, a color correction process such as input gamma correction, a spatial filter process, a color space conversion process, a density correction process, and a halftoning process but are not limited to them. The image processing unit 150 can create image data for printing by performing, for example, an image process for printing an image. Note that the image processing unit 150 may perform an image process for video data including image data of a plurality of frames.

The image display unit 160 displays the image data having undergone the image process by the image processing unit 150. The image display unit 160 may display a video having undergone the image process on an image display device such as a display. Instead of or in addition to the image display unit 160, the data processing apparatus may include an image printing unit 170. The image printing unit 170 executes printing according to the image data having undergone the image process by the image processing unit 150. The image printing unit 170 may be a printer that includes an inkjet head or thermal head and prints an image on a printing sheet based on the digital image signals of the image data.

The CPU circuit unit 100 includes a CPU 102 as an arithmetic control processor, a ROM 104 as a memory that stores permanent data or programs, a RAM 106 as a memory to which data or a program is temporarily loaded, and an external storage device 108. The CPU circuit unit 100 can comprehensively control the sequence of a process performed by the data processing apparatus, by controlling the image reading unit 120, the image processing unit 150, the image display unit 160, the image printing unit 170, and the like. The external storage device 108 is a storage medium such as a disk that can store parameters, programs, and correction data to be used by the data processing apparatus. The data, program, or the like may be loaded from the external storage device 108 to the RAM 106.

As described above, data transfer is performed among the image input unit 130, the image processing unit 150, the image display unit 160, and the image printing unit 170. Data transfer may be performed via the RAM 106 or the external storage device 108. For example, a WDMAC (Write Direct Memory Access Controller) 192 outputs the digital image signals input to the image input unit 130. The WDMAC 192 can store the image data in the RAM 106, the external storage device 108, or the like via a shared bus 190. Similarly, a WDMAC 196 can also store the image data from the image processing unit 150 in the RAM 106, the external storage device 108, or the like.

A RDMAC (Read Direct Memory Access Controller) 194 can read out the image data stored in the RAM 106, the external storage device 108, or the like via the shared bus 190, and input the digital image signal of a processing target pixel to the image processing unit 150. Similarly, a RDMAC 198 can also input, to the image display unit 160 or the image printing unit 170, the image data read out from the RAM 106 or the external storage device 108.

The CPU 102, the image input unit 130, the image processing unit 150, the image display unit 160, and the image printing unit 170 can set the operations of the WDMACs 192 and 196 and the RDMACs 194 and 198, and activate them.

(Connection Between Precedent Process and Subsequent Process)

As described above, data transfer is performed among the image input unit 130, the image processing unit 150, the image display unit 160, and the image printing unit 170. However, the specifications or constraints of data processes may be different among these processing units. The interface apparatus according to the first embodiment can connect the processing units while buffering (absorbing) the difference in specification or constraint of the data process between the processing units.

Figure 2A:
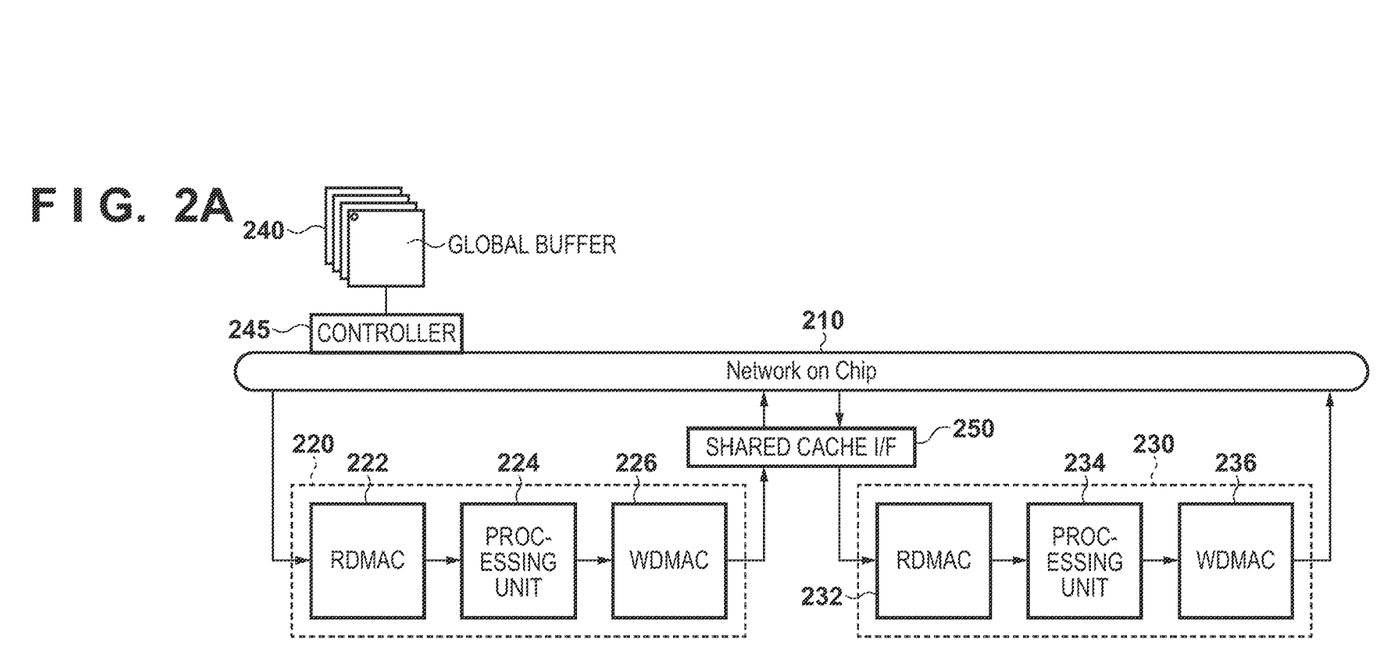
FIGS. 2A and 2B are block diagrams showing an example of connection between a precedent process and a subsequent process according to the embodiment.

In the following description, the interface apparatus according to the first embodiment is an interface apparatus that works as a shared cache of the plurality of processing units. This interface apparatus acquires data from a precedent processing unit (first processing unit) included in the plurality of processing units, and outputs it to a subsequent processing unit (second processing unit) included in the plurality of processing units. FIG. 2A shows part of the data processing apparatus according to the first embodiment. As shown in FIG. 2A, a shared cache I/F 250 (to be simply referred to as an I/F 250 hereinafter) as the interface apparatus according to this embodiment connects a precedent process block 220 and a subsequent process block 230. The precedent process block 220 will be simply referred to as the precedent process 220 hereinafter, and the subsequent process block 230 will be simply referred to as the subsequent process 230 hereinafter.

A processing unit 224 included in the precedent process 220 may be, for example, the image processing unit 150. In this case, a RDMAC 222 and a WDMAC 226 correspond to the RDMAC 194 and the WDMAC 196, respectively. Furthermore, a processing unit 234 included in the subsequent process 230 may be, for example, the image display unit 160. In this case, a RDMAC 232 corresponds to the RDMAC 198. At least one of the RDMAC 222 and a WDMAC 236 may be omitted.

In this example, the precedent process 220 generates a data group by performing the first data process for the input data. Then, the subsequent process 230 performs the second data process for the data group, thereby generating a process result obtained by performing the first data process and the second data process for the input data.

The interface apparatus according to the first embodiment may connect the remaining processing units shown in FIG. 1. Note that it is not essential for the processing unit to generate or modify data by the data process. For example, the precedent process 220 may serve as the image input unit 130, and the image input unit 130 may output received data intact. The subsequent process 230 may serve as the image display unit 160, and the image display unit 160 may output received data intact. Furthermore, the types of processing units connected by the interface apparatus according to the first embodiment are not limited to those shown in FIG. 1.

These Processing units may be implemented by hardware such as a pipeline circuit, or a combination of a processor and a program (software).

If each processing unit performs the data process for processing target data, it can sequentially perform the process for partial data included in the processing target data. For example, if the processing unit performs an image process for image data, it can process respective pixels in a raster scan order. On the other hand, the processing unit can divide the image data into regions, and perform the process for the regions sequentially.

For example, as a region division method of image data, two-dimensional division of image data can be used. In this case, the image data is divided into a plurality of tile regions (to be sometimes simply referred to as tiles or blocks hereinafter). An image in one tile will be referred to as a partial image hereinafter. A data process performed for each tile will be described below. In the following example, a process unit (or process granularity) is a partial image. The following data process for each tile can be referred to as a tile process or a block process. Note that one tile may correspond to one pixel.

Figure 3A:
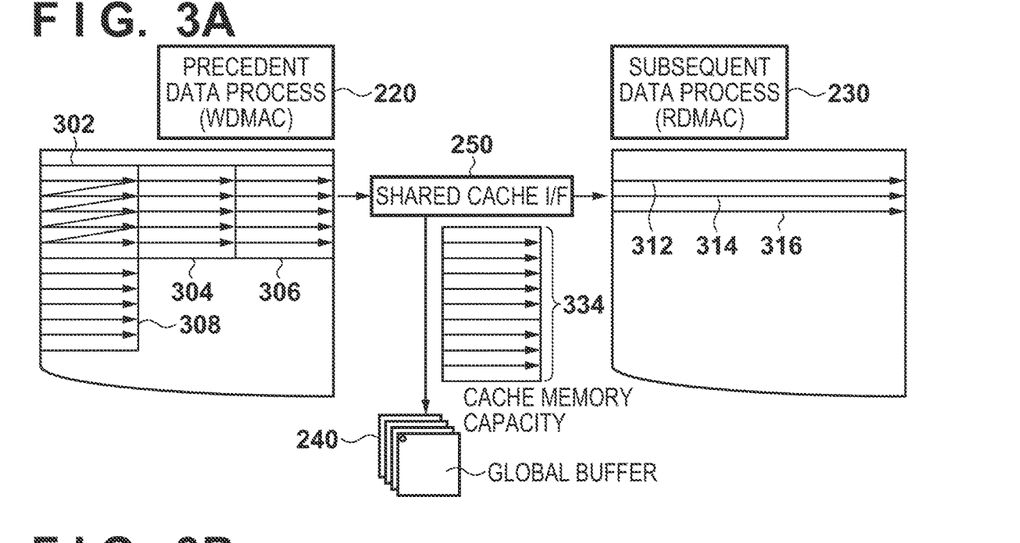
FIGS. 3A to 3C are views for explaining a data transfer operation.
Figure 4A:
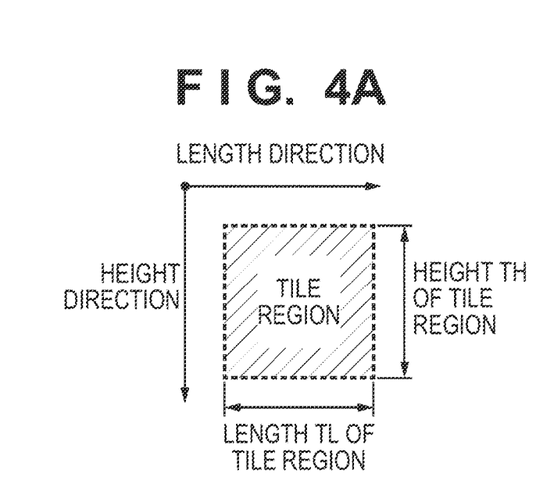
FIGS. 4A to 4E are views for explaining a tile scan.
Figure 4B:
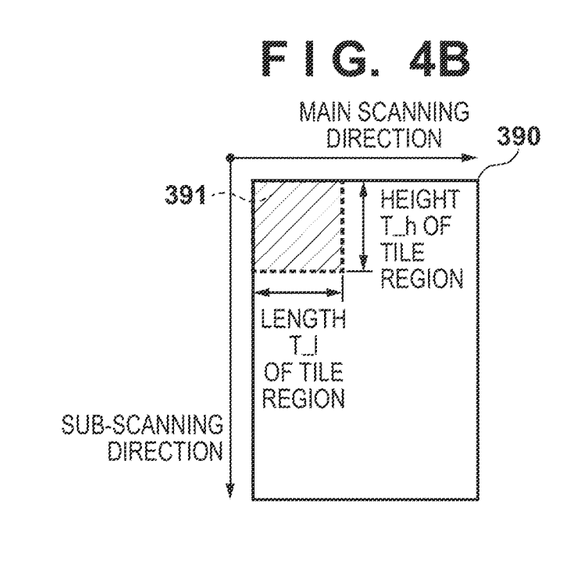
Figure 4C:
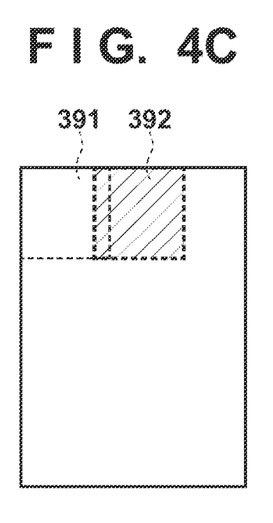
Figure 4D:
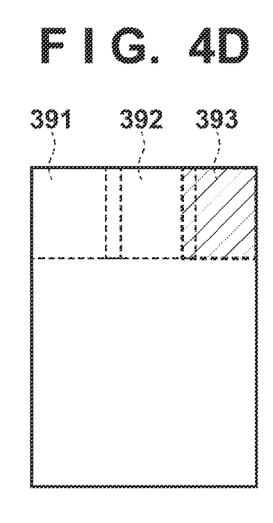
Figure 4E:
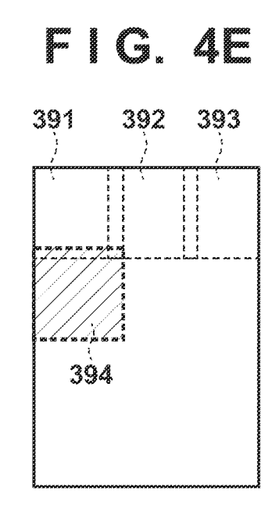

When performing an image process for image data, image data before the process is loaded, and image data after the process is generated. FIG. 3A shows an example of image data 300 generated in the precedent process 220. The image data 300 has been divided into a plurality of tiles, and FIG. 3A shows tiles 302 to 308 among the plurality of tiles. FIG. 4A shows an example of such a tile. The size of each tile is not particularly limited, and a length TL and a height TH may be arbitrary numbers of pixels. In FIG. 3A, one tile is a rectangular region of 5 pixels×5 pixels.

In the precedent process 220, a partial image is generated for each tile (to also be referred to as a tile scan or a block scan hereinafter). Data of respective pixels of a partial image are sequentially generated in an order of arrows shown in the tile 302. That is, in the precedent process 220, the tiles 302, 304, 306, and 308 are sequentially generated, thus obtaining image data after the process. The precedent process 220 outputs the partial image for each tile. That is, the precedent process 220 sequentially outputs the tiles 302, 304, 306, and 308. The data of the respective pixels of the partial image are sequentially output in the order of the arrows shown in the tile 302. At this time, the coordinates of the pixel being scanned in the entire image can be calculated from the position of the tile in the entire image and a scan position in the tile.

FIG. 3A also shows an example of the image data 300 that is referred to in the subsequent process 230. The image data generated in the precedent process 220 is identical to the image data that is referred to in the subsequent process 230 but the image data 300 is referred to in the raster scan order in the subsequent process 230. That is, in the subsequent process 230, the entire image undergoes the process with reference to data of respective pixels in an order of lines 312, 314, and 316. In this example, in the subsequent process 230, with reference to the line 312 of the image data 300, data of the corresponding line in the image data obtained by the image process for the image data 300 may be generated.

As described above, the subsequent process 230 performs the image process using the image data output from the precedent process 220. However, the output order of the data of the pixels from the precedent process 220 is different from the reference order of the data of the pixels by the subsequent process 230. Because of the difference in specification or constraint between the two connected processing units, data is temporarily held in some buffer from when the data is output from the precedent process 220 until the data is input to the subsequent process 230. The I/F 250 can provide the buffer. For example, the precedent process 220 can transmit, to the I/F 250 for each tile, the data included in each of the plurality of tiles set in the image and having the first size. The subsequent process 230 can receive, from the IF 250 for each tile, the data included in each of the plurality of tiles set in the image and having the second size different from the first size.

Example of Arrangement of Interface Apparatus

Figure 5:
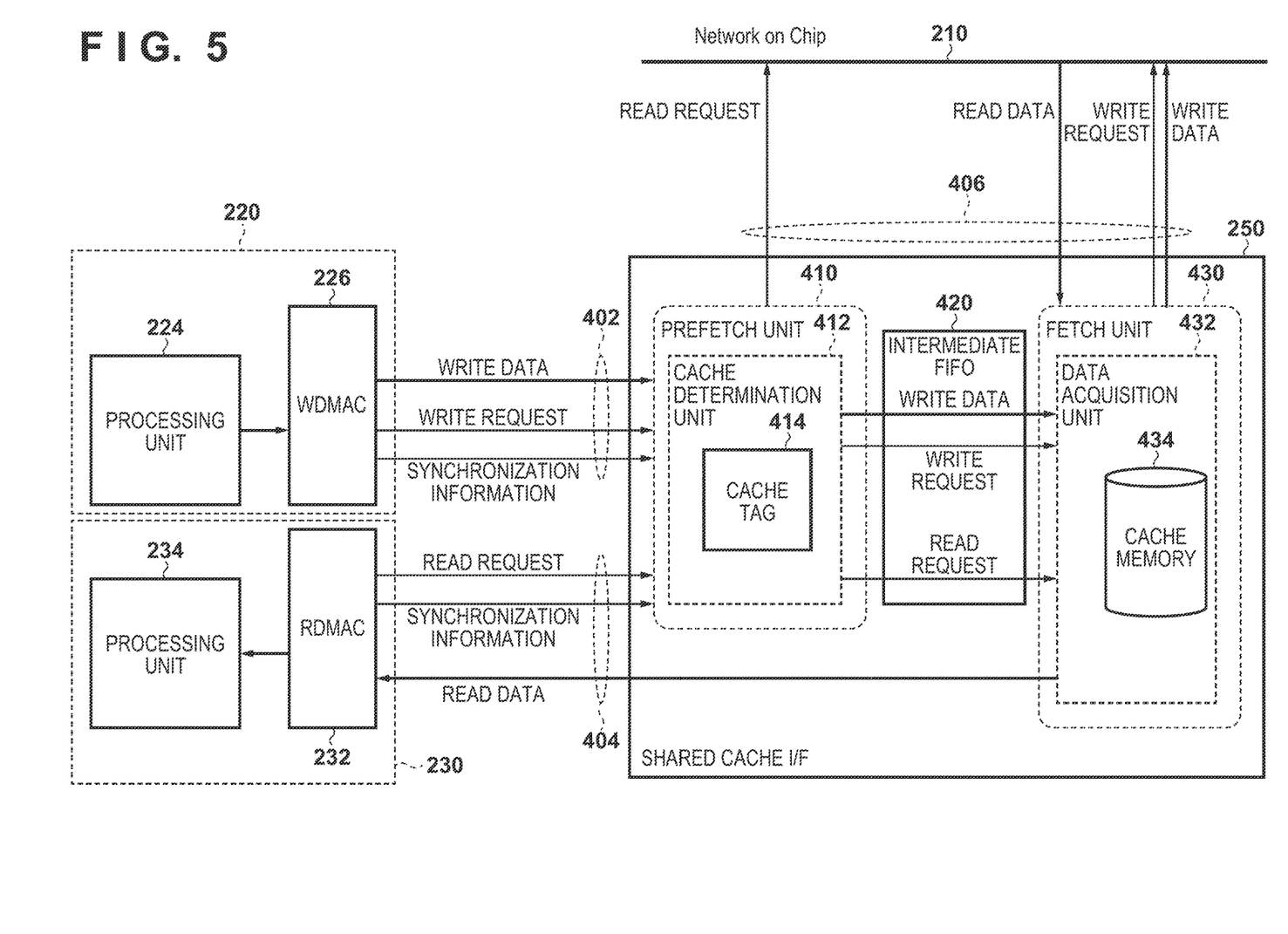
FIG. 5 is a block diagram showing an example of the arrangement of an interface apparatus according to the embodiment.

As shown in FIG. 5, the I/F 250 according to this embodiment for connecting the precedent process 220 and the subsequent process 230 includes a cache memory 434 that caches the data acquired from the precedent process 220. The I/F 250 further includes a cache determination unit 412. The cache determination unit 412 can control, based on information acquired from the subsequent process 230, whether to write back the data written in the cache memory 434 to a storage unit different from the cache memory 434. The cache determination unit 412 can implement cache control in the I/F 250.

A transferred data storage destination ensured in the storage unit different from the cache memory 434, such as the RAM 106 or the external storage device 108, will be referred to as a global buffer hereinafter. For example, a DRAM can be used as the global buffer. The cache memory 434 is an on-chip memory such as an SRAM, and is a memory for which a read/write operation can be performed at a higher speed than the global buffer.

In a normal cache memory, to prevent a data mismatch, when data is written in the cache memory, the same data is also written in the main memory (write through). Alternatively, data written in the cache memory is written in the main memory before the data is discarded (write back). However, the I/F 250 can control whether to discard the data written in the cache memory 434 after writing the data in the global buffer or discard the data without writing the data in the global buffer.

By using the I/F 250 having the arrangement, it is possible to improve the efficiency of the data transfer process from the precedent process 220 to the subsequent process 230. More specifically, as compared with a case in which the entire image data output from the precedent process 220 is written in a global buffer 240, it is possible to increase the process speed and reduce the power consumption. That is, if the entire image data obtained by the precedent process 220 is written in the global buffer 240 and read out from the global buffer 240, memory access corresponding to the data amounts of the two images occurs. In this embodiment, since part of the data acquired from the precedent process 220 is not written in the global buffer 240, it is possible to suppress a decrease in access speed and an increase in power consumption caused by an increase in memory access.

If the I/F 250 having the arrangement is used, it is possible to decrease the capacity of the cache memory 434. That is, it becomes unnecessary to provide a cache memory that can store the entire image data output from the precedent process 220. The manufacturing cost of a product can be reduced by decreasing the capacity of a cache memory that is often large in circuit scale.

FIG. 5 is a block diagram showing an example of the arrangement of the I/F 250. The I/F 250 includes a write port 402 as the first port for acquiring data from the precedent process 220, and a read port 404 as the second port for outputting the data acquired from the precedent process 220 to the subsequent process 230. The I/F 250 is connected to a Network on Chip 210 (to be referred to as a NoC 210 hereinafter). The global buffer 240 is also connected to the NoC 210, and the I/F 250 includes an access port 406 for inputting/outputting data to/from the global buffer 240 via the NoC 210. As shown in FIG. 2A, the I/F 250 can access the global buffer 240 via the access port 406, the NoC 210, and a controller 245 such as a DRAM controller. As shown in FIG. 5, the I/F 250 is connected to the precedent process 220 and the subsequent process 230 without intervention of the NoC 210.

Furthermore, the I/F 250 includes the cache memory 434 that caches the data acquired from the precedent process 220. The I/F 250 also includes the cache determination unit 412 that controls, based on the information acquired from the subsequent process 230, whether to write back the data written in the cache memory 434 to the global buffer 240.

A practical example of the arrangement of the I/F 250 will be described below with reference to FIG. 5. In this example, the I/F 250 serves as a multiport shared cache that can accept requests to the write port 402 and the read port 404 at the same time.

A write request, synchronization information, and write data are input to the I/F 250 via the write port 402. The write data is pixel data input from the precedent process 220. The write request is information acquired from the precedent process 220 and indicating that reception of the write data is requested. The write request can include information for specifying the write data. In the following example, the write request indicates a memory address in the global buffer 240 at which the write data is stored (as will be described later, the write data may not be stored in the global buffer 240). On the other hand, the write request may indicate the pixel position of the pixel corresponding to the write data. The synchronization information is information (first information) acquired from the precedent process 220. This data can indicate that the write data is data to be transferred to the subsequent process 230. Details will be described later.

Furthermore, a read request and synchronization information are input to the I/F 250 via the read port 404, and read data is output from the I/F 250 via the read port 404. The read data is pixel data input to the subsequent process 230. The read data is the write data input from the precedent process 220, and is stored in the cache memory 434 or the global buffer 240. The read request is information acquired from the subsequent process 230 and indicating that reception of the read data is requested. The read request can include information for specifying the read data. In the following example, the read request indicates a memory address in the global buffer 240 at which the read data is stored (as will be described later, the read data may not be stored in the global buffer 240). On the other hand, the read request may indicate the pixel position of the pixel corresponding to the read data. The synchronization information is information (second information) acquired from the subsequent process 230. This information can indicate that it is unnecessary to write back the read data from the cache memory 434 to the global buffer 240. Details will be described later.

Note that in this embodiment, the data amounts of the write data and the read data are equal to each other, and the address designation methods of the write request and the read request are the same. The data amounts of the write data and the read data are not particularly limited. For example, each of the write data the read data may correspond to data of one pixel or data of pixels included in a pixel block of a predetermined size (for example, 1 pixel in the vertical direction×8 pixels in the horizontal direction). As described above, the output order of the data of the pixels from the precedent process 220 may be different from the reference order of the data of the pixels by the subsequent process 230. That is, the write port 402 can acquire, from the precedent process 220, data included in a data group like image data in the first order. On the other hand, the read port 404 can output the data included in the data group to the subsequent process 230 in the second order different from the first order.

The I/F 250 includes a prefetch unit 410, an intermediate FIFO 420, and a fetch unit 430. The prefetch unit 410 can perform cache determination and a prefetch operation. In this embodiment, the prefetch unit 410 accepts a write request to the write port 402 and a read request to the read port 404. The prefetch unit 410 performs cache determination for each request using the cache determination unit 412 included in the prefetch unit 410. That is, the cache determination unit 412 can determine a cache hit or a cache miss. More specifically, if it is determined that the data corresponding to the memory address in the global buffer 240 designated by the write request is stored in the cache memory 434, the cache determination unit 412 determines a cache hit. On the other hand, if it is determined that the data is not stored in the cache memory 434, the cache determination unit 412 determines a cache miss. If it is determined that the read data designated by the read request is stored in the cache memory 434, the cache determination unit 412 determines a cache hit; otherwise, the cache determination unit 412 determines a cache miss.

As a result of the cache determination process with respect to the write request, the write request, and the write data are sent from the prefetch unit 410 to a data acquisition unit 432 included in the fetch unit 430 via the intermediate FIFO 420. The data acquisition unit 432 stores the write data in the cache memory 434.

In response to a normal write request, the data acquisition unit 432 can perform an operation that is executed at the time of write in the normal cache memory. If, for example, the prefetch unit 410 determines a cache hit with respect to the write request, the data at the address designated by the write request is stored in the cache memory 434. Therefore, the fetch unit 430 overwrites the data in the cache memory 434 with the write data sent from the prefetch unit 410 to the data acquisition unit 432. If the prefetch unit 410 determines a cache miss with respect to the write request, the data at the address designated by the write request is not stored in the cache memory 434. In this case, the prefetch unit 410 issues a read request to the global buffer 240 via the access port 406. Then, the fetch unit 430 overwrites the data received from the global buffer 240 with the write data, and stores the thus obtained data in the cache memory 434.

On the other hand, in this embodiment, when transferring, to the I/F 250, the data to be transferred to the subsequent process 230, the precedent process 220 issues a write request to the I/F 250 by designating a preload command. In this case, even if the prefetch unit 410 determines a cache miss with respect to the write request, no read request is issued to the global buffer 240. In this case, the data acquisition unit 432 stores, in the cache memory 434, the write data input in synchronism with the write request.

A cache determination result to the read request and the read request are also sent from the prefetch unit 410 to the data acquisition unit 432 via the intermediate FIFO 420. With respect to the read request, the data acquisition unit 432 can perform an operation that is executed at the time of write in the normal cache memory.

If, for example, the prefetch unit 410 determines a cache hit with respect to the read request, the data at the address designated by the read request is stored in the cache memory 434. Therefore, the prefetch unit 410 need not issue a read request to the global buffer 240. When the read request arrives at the fetch unit 430, the data acquisition unit 432 extracts the data indicated by the read request from the cache memory 434, and transfers it as read data to the read port 404.

On the other hand, if the prefetch unit 410 determines a cache miss with respect to the read request, the data at the address designated by the read request is not stored in the cache memory 434. Therefore, the prefetch unit 410 issues a read request to the global buffer 240 via the access port 406. Then, similar to a case in which a cache miss is determined with respect to the read request, data including the data at the memory address designated by the read request is input to the fetch unit 430. When the read request arrives at the fetch unit 430, the data acquisition unit 432 receives the data from the global buffer 240, and stores it in the cache memory 434. The data acquisition unit 432 transfers, as read data, the data indicated by the read request to the read port 404.

As described above, the I/F 250 can perform appropriate processes for the write request and the read request.

Figure 6:
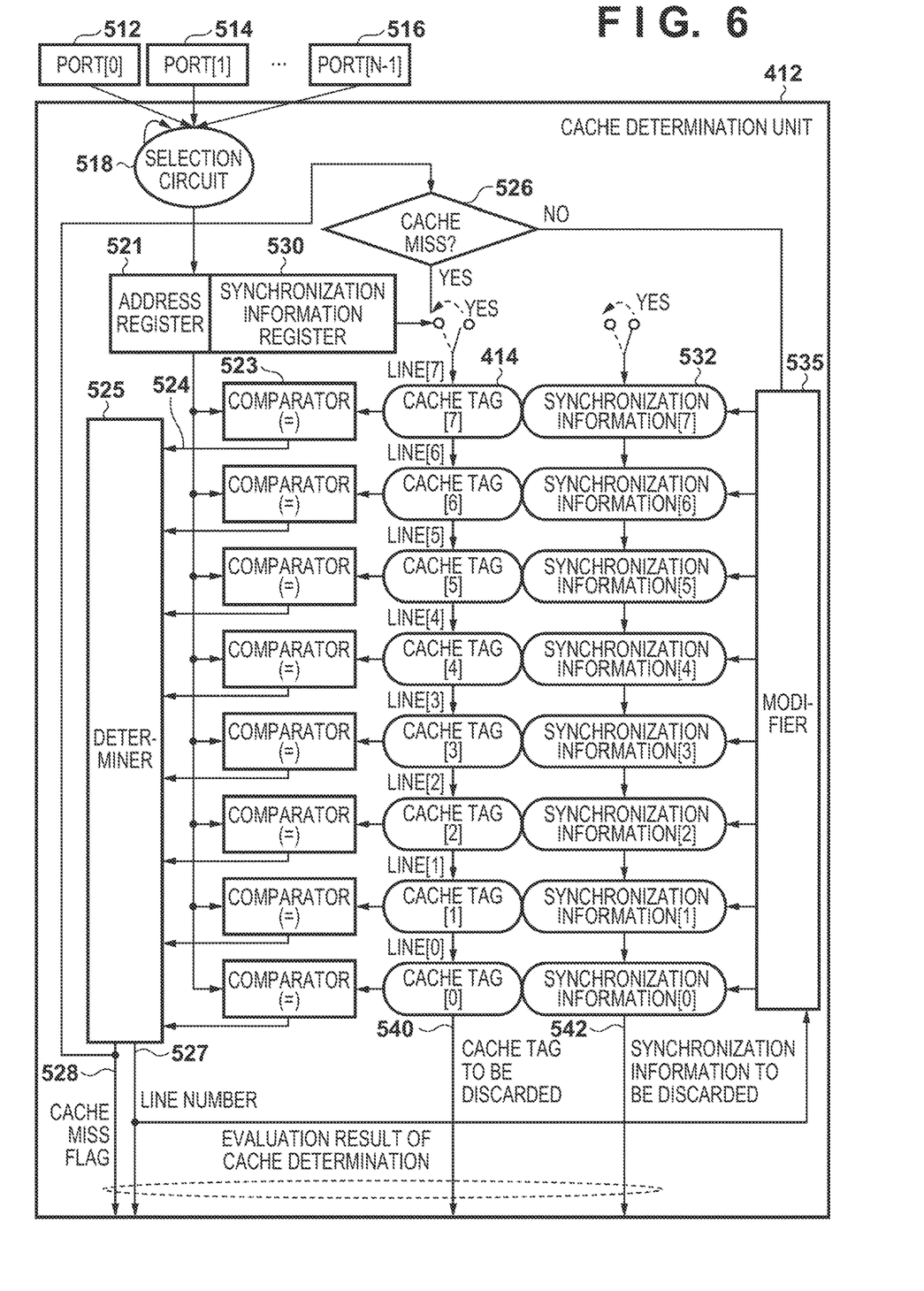
FIG. 6 is a block diagram showing an example of the arrangement of a cache determination unit 412.

The arrangement of the cache determination unit 412 will be described next with reference to FIG. 6. In the following example, a fully associative scheme is used as an associative (line selection) scheme, and the I/F 250 performs a cache operation according to the fully associative scheme. Since the I/F 250 is a multiport shared cache, requests from a plurality of ports are input to the cache determination unit 412. FIG. 6 shows a port [0] 512, a port [1] 514, . . . , a port [N−1] 516 as a plurality of ports. The above-described write port 402 and read port 404 are two of these ports.

A selection circuit 518 selects one of requests input from the ports 512 to 516. An address indicated by the selected read request or write request is stored in an address register 521. Furthermore, the synchronization information input to the write port 402 or the read port 404 is stored in a synchronization information register 530.

The cache determination unit 412 can store eight cache tags 414. In this example, the I/F 250 serves as a cache device adopting an 8-node fully associative scheme. The eight cache tags 414 are added with predetermined numbers ([0] to [7]), and each of these numbers represents a "relative" cache line number of the corresponding cache memory. In the example shown in FIG. 6, the cache memory 434 includes eight cache lines, and the eight cache lines store data in accordance with a FIFO method. Note that the number of cache lines and the capacity of each cache line are not particularly limited, and can be set appropriately.

In addition, the cache determination unit 412 can store eight pieces of synchronization information 532. Each piece of synchronization information 532 corresponds to one of the eight cache tags 414, and is added with the same number ([0] to [7]). Each piece of synchronization information 532 can indicate the synchronization information input to the write port 402, the synchronization information input to the read port 404, or an operation result of these pieces of information. In the following example, each piece of synchronization information 532 is the synchronization information input to the write port 402 or an operation result of this synchronization information and the synchronization information input to the read port 404.

In the following example, the "relative" cache line number of the cache line in which oldest data is stored is [0], and the "relative" cache line number of the cache line in which latest data is stored is [7]. If a cache miss is determined, the "relative" cache line number of the cache line in which new data is to be stored (the data to be discarded is stored) is [7].

The cache determination unit 412 includes eight comparators 523, and each of the comparators 523 corresponds to one of the eight cache tags 414. Each comparator 523 compares an address stored in the corresponding cache tag 414 with that stored in the address register 521, and outputs, to a determiner 525, a comparison result 524 indicating whether the addresses "match".

At least one of the eight comparison results 524 output from the eight comparators 523 indicates "match", the determiner 525 determines a cache hit. On the other hand, none of the eight comparison results 524 indicates "match", the determiner 525 determines a cache miss.

If a cache miss is determined (YES at a branch 526), the cache tags 414 are updated to have, as a value, the address held in the address register 521. In FIG. 6, the cache tags 414 are stored in a memory area including a shift register. If the determination result indicates a cache miss, a shift operation is performed and the value of each cache tag moves to the lower cache tag. That is, the value of the cache tag [0] changes to the value of the cache tag [1], and the value of the cache tag [1] changes to the value of the cache tag [2]. Similarly, movement is repeated, and the value of the cache tag [6] changes to the value of the cache tag [7]. Then, the value of the cache tag [7] changes to the value of the address stored in the address register 521.

As described above, in the example shown in FIG. 6, a cache tag replacement method of the "FIFO method (round robin method)" for discarding the value of the old cache tag [0] is used. When this method is adopted in the cache device of the fully associative scheme, the device can be simplified.

If a cache miss is determined, the pieces of synchronization information 532 are updated to hold the value stored in the synchronization information register 530. In the example shown in FIG. 6, the pieces of synchronization information 532 are stored in the memory area including the shift register, similar to the cache tags 414. If a cache miss is determined, the shift operation of the pieces of synchronization information 532 is performed and the value of each piece of synchronization information 532 moves to the lower synchronization information, similar to the cache tags 414. That is, the value stored in the synchronization information register 530 is written in the synchronization information [7], and the value of the old synchronization information [0] is discarded.

On the other hand, if a cache hit is determined, the cache tags 414 and the pieces of synchronization information 532 are not updated. If a cache hit is determined, a modifier 535 modifies the synchronization information 532 corresponding to the cache tag 414 for which a cache hit is determined. That is, the modifier 535 modifies the value of the synchronization information 532 having the same number as that ([0] to [7]) of the cache tag 414 having the value that matches the address stored in the address register 521.

The determiner 525 outputs, as a cache miss flag 528, a cache determination result indicating the cache hit or cache miss. If the determination result indicates the cache hit, the determiner 525 outputs, as a line number 527, the number ([0] to [7]) of the cache tag 414 having the value that matches the address stored in the address register 521. On the other hand, if the determination result indicates the cache miss, the determiner 525 outputs 7 (that is, the number of the cache tag [7]) as the line number 527. Furthermore, if the cache miss is determined, the cache determination unit 412 also outputs, as the cache determination result, a value 540 of the cache tag [0] discarded by the shift operation and a value 542 of the synchronization information [0] discarded by the shift operation. In accordance with these pieces of information, the prefetch unit 410 and the fetch unit 430 can perform the above-described operations.

Note that if the cache hit is determined, upon receiving the write request, the fetch unit 430 stores the write data in the cache line indicated by the line number 527. Upon receiving the read request, the fetch unit 430 reads out the read data from the cache line indicated by the line number 527.

On the other hand, if the cache miss is determined, the fetch unit 430 discards the data stored in the cache line [7] indicated by the line number 527 in accordance with the value 542 of the synchronization information [0], or write back the data to the global memory. When writing back the data, the fetch unit 430 writes back the data to an address indicated by the value 540 of the cache tag in the global memory. Upon receiving the write request, the fetch unit 430 stores the write data in the cache line [7] indicated by the line number 527. Upon receiving the read request, the fetch unit 430 writes the data received from the global buffer 240 in the cache line [7] indicated by the line number 527.

Operation Example

In this embodiment, the I/F 250 transfers the process result of the precedent process 220 to the subsequent process 230, and saves, in the global buffer 240, the process result that cannot be transferred. Such process control can be implemented by using, for example, the synchronization information as follows.

In this embodiment, if the precedent process 220 transfers the process result to the subsequent process 230, the precedent process 220 issues a write request to the I/F 250 using the preload command. In the example shown in FIG. 6, when sending the preload command, the precedent process 220 inputs the synchronization information having a value "1" to the I/F 250.

As described above, if the preload command is input, the cache determination unit 412 determines a cache miss. That is, as described above, the address is written in the cache tag, and the pieces of synchronization information 532 are updated to hold "1" as the value of the synchronization information input from the precedent process. Furthermore, as described above, in this case, the prefetch unit 410 issues no read request to the global buffer 240, and the write data as the process result of the precedent process 220 is stored in the cache memory 434.

On the other hand, to acquire the process result of the precedent process 220, the subsequent process 230 issues a read request to the I/F. In the example shown in FIG. 6, when issuing a read request, the subsequent process 230 inputs the synchronization information having a value of "1" to the IF 250. As described above, the cache determination unit 412 performs cache determination in accordance with an address indicated by the read request. If a cache hit is determined, the modifier 535 modifies the synchronization information 532. In this embodiment, the modifier 535 performs an XOR (Exclusive-OR) operation of the synchronization information 532 corresponding to the cache tag 414 for which a cache hit is determined and the value in the synchronization information register 530. The synchronization information 532 corresponding to the cache tag 414 for which the cache hit is determined is updated by a value obtained by the XOR operation. In this embodiment, if the data from the precedent process 220 is stored in the cache memory 434 by the preload command, the value of the corresponding synchronization information 532 becomes "1", as described above. On the other hand, when the read request is received, the value in the synchronization information register 530 is "0", as described above. Therefore, the read request is issued to the data stored in the cache memory 434, the value of the corresponding synchronization information 532 changes from "1" to "0".

As the processes of the precedent process 220 and the subsequent process 230 advance, the cache tags are updated, and some of the cache tags are discarded from the cache determination unit 412, as described above. At this time, the value 540 of the cache tag to be discarded, the value 542 of the synchronization information to be discarded, and the line number 527 are input to the fetch unit 430.

If the input value 542 of the synchronization information is "0", the data from the precedent process 220, which corresponds to the address indicated by the value 540 of the cache tag, has been transferred to the subsequent process 230 in accordance with the read request from the subsequent process 230. Therefore, it is unnecessary to save the data in the global buffer 240. This data is stored in the cache line corresponding to the line number 527 of the cache memory 434 by the preload command. Thus, if the input value 542 of the synchronization information is "0", the fetch unit 430 discards the data of the cache line corresponding to the line number 527 in the cache memory 434.

On the other hand, if the input value 542 of the synchronization information is "1", the data from the precedent process 220, which corresponds to the address indicated by the value 540 of the cache tag, has not been transferred to the subsequent process 230 since no read request is sent from the subsequent process 230. This data has been stored in the cache line corresponding to the line number 527 of the cache memory 434 by the preload command. Thus, the input value 542 of the synchronization information is "1", the fetch unit 430 saves, in the global buffer 240, the data stored in the cache line corresponding to the line number 527 in the cache memory 434. More specifically, the fetch unit 430 stores (writes back) the data at the address in the global buffer 240 indicated by the value 540 of the cache tag.

As described above, the write data is temporarily stored in the cache memory by the write request from the precedent process 220. Then, whether to write back the write data to the global buffer 240 is controlled by the read request from the subsequent process 230. As described above, the subsequent process 230 that receives the data determines whether to execute a write back operation for the write data transmitted by the precedent process 220. More specifically, reference is made to the synchronization information that is obtained from the subsequent process 230, indicates that the read data need not be written back from the cache memory 434 to the global buffer 240, and is input to the read port 404. Then, in accordance with at least such synchronization information, whether to write back the data to be discarded is switched. In the above example, when discarding the data written in the cache memory 434, the presence/absence of a write back operation is switched in accordance with the synchronization information.

In the above-described practical example, if it is indicated that the write data is data to be transferred to the subsequent process 230 using the preload command, "1" is stored as the value 542 of the synchronization information in association with the data stored in the cache memory 434. This synchronization information indicates that the write data obtained from the precedent process 220 is data to be transferred to the subsequent process 230. The data thus stored in the cache memory 434 is not acquired from the global buffer 240 but acquired from the precedent process 220 directly. On the other hand, when requesting the data thus stored in the cache memory 434, the subsequent process 230 can input "0" as synchronization information to the read port 404. This synchronization information indicates that the read data obtained from the subsequent process 230 need not be written back from the cache memory 434 to the global buffer 240. In accordance with these pieces of information, the fetch unit 430 discards the data written in the cache memory 434 without writing back the data to the global buffer 240.

As described above, the fetch unit 430 controls, based on both the synchronization information obtained from the precedent process 220 and that obtained from the subsequent process 230, whether to write back the data written in the cache memory 434 to the global buffer 240. Especially in the above example, "0" as an operation result of the synchronization information obtained from the precedent process 220 and that obtained from the subsequent process 230 is stored as the value 542 of the synchronization information. Then, write back control is performed in accordance with the value 542 of the synchronization information. On the other hand, this arrangement is merely an example. For example, each of the synchronization information obtained from the precedent process 220 and that obtained from the subsequent process 230 may be stored as the value 542 of the synchronization information.

Operation Example in Case in which Tile Scan is Performed in Subsequent Process

By using the I/F 250 according to the first embodiment, the operation can be implemented regardless of the scan orders used by the precedent process 220 and the subsequent process 230. In the first embodiment, as shown in, for example, FIG. 3A, the precedent process 220 executes a tile scan, and the subsequent process 230 executes a raster scan. However, the precedent process 220 and the subsequent process 230 are not limited to them. For example, the method according to the first embodiment is effective even if the precedent process 220 executes a tile scan according to tiles of a predetermined size and the subsequent process 230 executes a tile scan according to tiles of a different size. In this case, for example, the subsequent process 230 can acquire pixel data of each pixel in one tile from the IF 250, and perform a process using the acquired pixel data, thereby generating pixel data after the process of each pixel in this tile. The subsequent process 230 can generate image data after the process by repeating the process for each tile. In this case as well, the I/F 250 can output, from the cache memory 434, data requested to the subsequent process 230 or acquire the requested data from the global buffer 240 and output it, as described above.

On the other hand, in the process for one tile, pixel data of pixels outside the tile may be referred to. For example, if the subsequent process 230 performs a filter process such as an FIR filter for the image data, pixel data of peripheral pixels may be referred to in order to calculate pixel data of a given pixel. In this case, in addition to the pixel data of each pixel in one tile, the subsequent process 230 acquires, from the I/F 250, pixel data of a larger tile including the peripheral pixels of the tile.

In the example shown in FIGS. 4B to 4E, when processing the first tile, the subsequent process 230 acquires data in a region 391 as a larger tile. Similarly, when processing the second to fourth tiles, the subsequent process 230 acquires data in regions 392 to 394 as larger tiles. In FIGS. 4B to 4E, a region where data of a pixel is acquired by the subsequent process 230 twice or more is hatched. Such a region will be referred to as an overlap region hereinafter. For example, if the subsequent process 230 performs a filter process with reference to 25 pixels in total of 5 pixels in the vertical direction and 5 pixels in the horizontal direction by centering a processing target pixel, the overlap region has a width of 2 pixels.

Figure 3B:
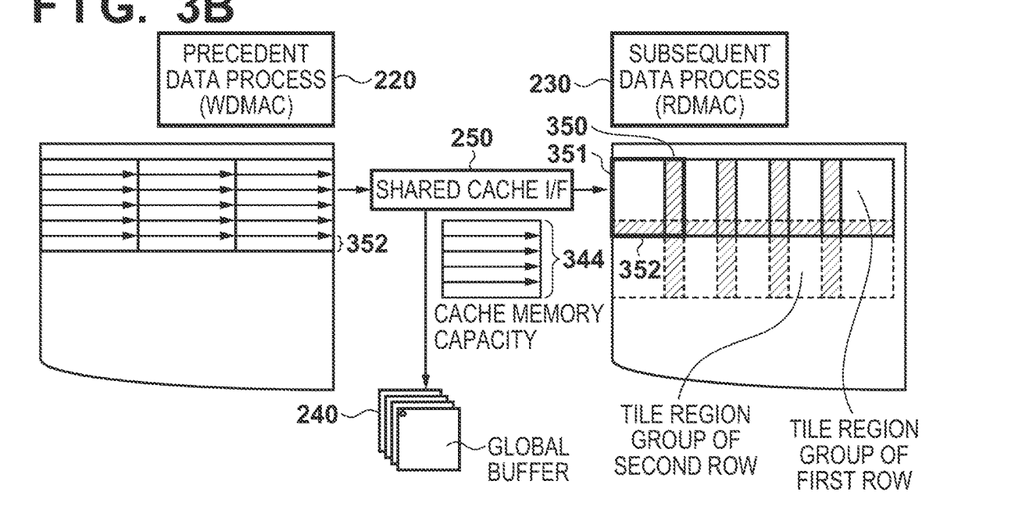

An example of the operation of the interface apparatus according to this embodiment when such an overlap region exists will be described below with reference to FIG. 3B. In FIG. 3B, the subsequent process 230 attempts to acquire image data of a region 350 from the I/F 250. When issuing a read request to data of a region 351 within the region 350, the subsequent process 230 sets "1" as synchronization information at the time of issuing the read request, similar to the case shown in FIG. 3A. The region 351 is a region that is not an overlap region, that is, a region that is not referred to in the subsequent tile process. In this case, as described above, if a cache hit occurs, the data stored in the cache memory 434 is discarded without being written back.

As described above, when requesting data of the I/F 250, the subsequent process 230 can determine whether to request the data again in a subsequent process. When it is determined that the data is not requested again, the subsequent process 230 can transmit, to the IF 250, synchronization information ("1") indicating that the requested data need not be written back from the cache memory 434 to the global buffer 240.

On the other hand, when issuing a read request to data of a region 352 within the region 350, the subsequent process 230 sets "0" as synchronization information at the time of issuing the read request. The region 352 is a region that is an overlap region, that is, a region that is referred to in the subsequent tile process. In this case, even if a cache hit occurs, as a result of an XOR operation, the value of the synchronization information 532 corresponding to the data stored in the cache memory 434 remains "1". Therefore, even if a cache hit occurs, the data stored in the cache memory 434 is written back to the global buffer 240. As a result, at the time of executing the subsequent tile process, it is possible to acquire, from the global buffer 240, data of the region to be referred to.

In this way, it is possible to control synchronization information indicating the necessity of writing back, from the cache memory 434 to the global buffer 240, the data requested by the subsequent process 230 and transmitted to the IF 250. The subsequent process 230 can execute such control in accordance with whether the data is included in another tile region (that is, the data is included in an overlap region) when requesting the data included in the tile region of the IF 250.

Note that the operation of the interface apparatus according to this embodiment is not limited to the above operation. For example, in an example shown in FIG. 3C, the subsequent process 230 acquires data of a region 360 when processing one tile. In the example shown in FIG. 3C, a row 382 is loaded after loading of a row 381 ends. Thus, when loading data of a region 375 to process another tile, data of a region 364 at the lower end of the region 360 is probably discarded from the cache memory. Therefore, to save the data of the region 364 in the global buffer 240, the subsequent process 230 sets "0" as synchronization information when issuing a read request to the data of the region 364.

Figure 3C:
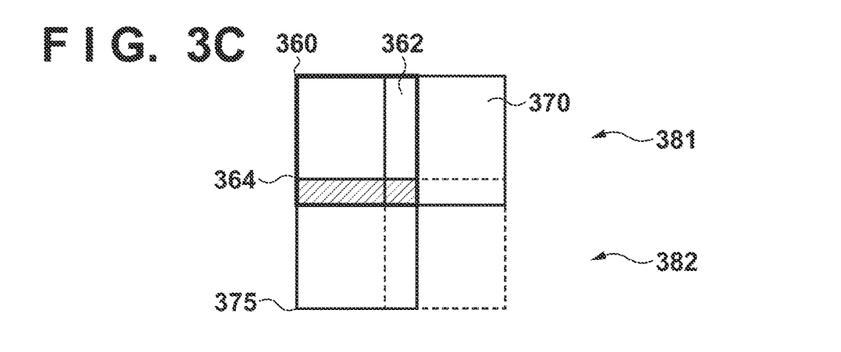

On the other hand, in the example shown in FIG. 3C, after loading of the data of the region 360 ends, data of a region 370 is loaded. Therefore, the region 370 includes a region 362 but a cache hit occurs with respect to data of the region 362 when loading the data of the region 370. That is, since it is unnecessary to save the data of the region 362 in the global buffer 240, the subsequent process 230 may set "1" as synchronization information when issuing a read request to the data of the region 364.

The type of the subsequent process 230 is not particularly limited, and this embodiment is applicable to a case in which the subsequent process 230 performs a process of changing the size of an image, such as resolution conversion (arbitrary magnification process). When resolution conversion is performed using a region division method such as a tile process, the size of a region to be referred to in the process or the size of a region to be output by the process may change depending on a magnification in accordance with the position of a tile in the image. On the other hand, since the subsequent process 230 can detect the change of the size of the region to be referred to, it is possible to obtain data necessary for the process by changing the number of read requests in accordance with the change of the size of the region. Furthermore, since the subsequent process 230 can detect the change of the size of the region to be referred to and the change of the size of the region to be output, it is also possible to detect a change of the above-described overlap region. Therefore, the subsequent process 230 can control whether to perform a write back operation by changing the value of the synchronization information, as described above.

As described above, according to this embodiment, the I/F 250 can directly transfer at least part of the data processed by the precedent process 220 to the subsequent process 230 without temporarily saving it in the global buffer 240. The I/F 250 saves, in the global buffer 240, only data which has not been transferred directly. By directly connecting the precedent process 220 and the subsequent process 230 using the I/F 250 in this way, it is possible to separate data directly transferred to the subsequent process 230 without being saved in the global buffer 240 and data saved in the global buffer 240. Thus, as compared with a case in which the entire image data output from the precedent process 220 is written in the global buffer 240, the process speed can be improved and the power consumption can be reduced. As described above, it is possible to improve the efficiency of the data transfer process from the precedent process 220 to the subsequent process 230 using the I/F 250.

The I/F 250 can perform the separation operation in accordance with the size of the cache memory 434. To directly transfer data from the precedent process 220 to the subsequent process 230, the subsequent process 230 needs to issue a read request before the data is saved in the global buffer 240. Therefore, as the capacity of the cache memory 434 is larger, the time limit of the read request for directly transferring data is later. If direct data transfer is performed, the I/F 250 discards the data from the cache memory 434 without writing it back to the global buffer 240, and thus an access amount to the global buffer 240 is reduced. Therefore, it is possible to adjust the balance between the size of the cache memory and the access amount to the global buffer 240. As the capacity of the cache memory 434 is larger, the precedent process 220 and the subsequent process 230 can be coupled more loosely and the operation of the I/F 250 on the system is more stable.

Second Embodiment

Figure 2B:
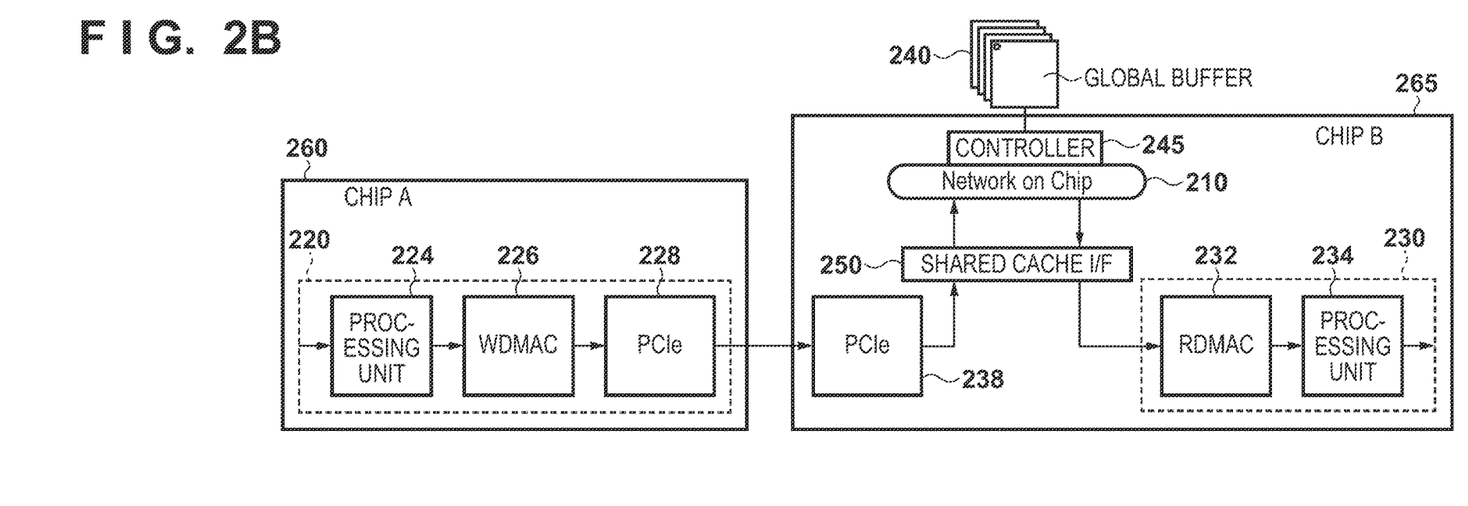

In the first embodiment, the precedent process 220 and the subsequent process 230 in one chip are connected. However, the precedent process 220 and the subsequent process 230 may be mounted on different chips. In the second embodiment, as shown in FIG. 2B, a chip 265 (chip B) includes an I/F 250 and a subsequent process 230. The I/F 250 has the same function as in the first embodiment, and is connected to a precedent process 220 included in a chip 260 (chip A) different from the chip 265. A WDMAC 226 of the precedent process 220 issues a write request of a process result by a processing unit 224 to an address in a global buffer 240 of the chip 265. In FIG. 2B, PCIe is used as an example of an interface between the chips, and PCIe 228 of the chip 260 converts the write request into a PCIe transfer protocol, and transfers it to the chip 265. PCIe 238 of the chip 265 receives the transferred data from the chip 260, and issues a write request to the I/F 250. The functions of the subsequent process 230, a NoC 210, a controller 245, and the global buffer 240 of the chip 265 are the same as in the first embodiment.

With this arrangement, it is possible to perform data transfer between processing units while absorbing a difference in specification or constraint of a data process between the processing units over a plurality of chips. In this example, it is unnecessary to transfer data of a data amount equal to or larger than that output from the precedent process 220. In this example, the chip 265 including the subsequent process 230 includes the I/F 250 and the global buffer 240. Therefore, in this arrangement, it is possible to adjust the balance between the size of a cache memory in the chip 265 and an access amount to the global buffer 240. The precedent process 220 of the chip 260 can transfer predetermined synchronization information via an interface between the chip, similar to the first embodiment. Furthermore, the I/F 250 of the chip 265 can modify the synchronization information received from the precedent process 220 by synchronization information received from the subsequent process 230, similar to the first embodiment.

Modifications to First and Second Embodiments

Modification of the synchronization information in the first and second embodiments will be described in more details. When adopting a method according to the first embodiment, modification of the synchronization information can be performed as follows. Namely, it is possible to calculate synchronization information of a desired cache line using the synchronization information inputted to the write port 402 along with the write request and the synchronization information inputted to the read port 404 along with the read request. If a cache miss occurs, the synchronization information [0] of the oldest cache line [0] is discarded from the cache I/F 250. In this case, if the discarded synchronization information [0] has a value of 1, the cache data can be written back to the global buffer 240 (which may be a DRAM).

On the other hand, it may be desired to prioritize transfer of data from the write port to the read port, for example, when data is transmitted/received between the chips as in the second embodiment. In such a case, it is possible to employ an operation that does not perform a write back operation. For example, it is possible to stall (temporarily stop) an input from the write port 402, and prioritize processing of a read request from the read port 404. The stall (temporary stop) of the input from the write port 402 can be canceled when a read request of the oldest cache line [0] is input, a value of the synchronization information [0] is changed from 1 to 0, and thus the cache data of the cache line [0] can be discarded.

In such an embodiment, it is possible to reduce a write back amount to the global buffer 240, by prioritizing data transmission to the read port 404 rather than data reception from the write port 402. In addition, since a data reread amount from the global buffer 240 can be reduced, an access band to the global buffer 240 (which may be a DRAM) can be reduced, and transfer from the write port 402 to the read port 404 can be performed with low latency.

The control method using the synchronization information will be described in more detail. In the method of the first embodiment, the synchronization information is a 1-bit flag, and the data transfer ratio between reception of data from the write port 402 and transmission of data to the read port 404 is one to one. On the other hand, the synchronization information may be an N-bit (N is 1 or more) count value. Below is an explanation of an example where the data received from the write port 402 is read out from the read port 404 seven times. In this case, the synchronization information inputted to the write port 402 along with the write request can have the value of 7. The inputted synchronization information (with a value of 7) is written as the synchronization information [7] of the cache line [7]. Every time a cache hit occurs with a read request to the read port 404, the synchronization information stored in a corresponding cache line is decremented by one. And then, when the cache data is discarded from the oldest cache line [0], the write back operation is not performed if the corresponding synchronization information [0] has a value of 0, and the cache data is written back to the global buffer 240 (which may be a DRAM) if the synchronization information [0] has a value of 1 or more. In this case, a data transfer ratio from the write port 402 to the read port 404 can be controlled to 1:7.

By making use of the synchronization information, it is possible to control the data transfer ratio even if the data transfer ratio between reception from the write port 402 and transmission to the read port 404 is not fixed in advance. For example, 8-bit synchronization information can be used, and the precedent process 220 can write the synchronization information with a value of 0xFF (i.e., infinite times) from the write port 402 to the I/F 250 along with the write request. At this time, the precedent process 220 does not need to know how the transmitted data is used in the subsequent process 230. The data transfer ratio can be determined by the subsequent process 230 that uses the data. Also in this case, by performing an operation with the value of the synchronization information inputted to the read port 404 along with the read request and the synchronization information of the cache line for which a cache hit has occurred, it can be determined whether the cache data of the cache line is written back or discarded.

For example, the subsequent process 230 can read out the desired cache data a necessary number of times by inputting a read request to the read port 404. If there is no desired data in the cache memory, the data and the synchronization information are read out from the global buffer 240 (which may be a DRAM) and transmitted to the read port 404. When the desired data is read out last time in accordance with the read request to the read port 404, the synchronization information of the cache line can be forcibly overwritten by a value of 0. The cache data of this cache line will be discarded from the cache memory without being written back to the global buffer 240. The subsequent process 230 can overwrite the synchronization information in this way using the synchronization information to be inputted to the read port 404 along with the read request.

In such an embodiment, it is possible to readily control the data transfer ratio between the data transmitted from the precedent process 220 and the data received by the subsequent process 230. In particular, a flexible data transfer ratio can be implemented by the subsequent process 230 controlling the synchronization information, as the above embodiment. In this case, the precedent process 220 can only simply transmit data.

Third Embodiment

In order to transmit/receive image data in different scanning orders, and to consider an overlap region in a filter processing, a cache memory with a capacity as large as possible may be used in the above embodiments. The larger capacity the cache memory has, the larger reduction of an access to the global buffer (which may be a DRAM) for data saving and data rereading can be achieved, thereby reducing the access band to the global buffer.

Therefore, it is possible to use a next-generation non-volatile memory (NVM) such as a spin-transfer torque magnetic RAM (STT-MRAM) as a cache memory, instead of a conventional SRAM. It is also possible to use an FRAM, ReRAM, or PCM, which are referred to as a next-generation memories. For example, the STT-MRAM is smaller in size of a circuit element than the SRAM, and can readily have four or more times as large capacity as the SRAM, and therefore it is possible to use a cache memory with a larger capacity. With respect to the power consumption of the STT-MRAM in comparison to the SRAM, read access consumes about 1/60 while write access consumes about 1.6 times. However, as the above modification, the interface apparatus according to an embodiment of the present invention can readily control the data transfer ratio, i.e., the number of times of reading by the subsequent process 230 per one writing by the precedent process 220. Thus, it is possible to make use of the power consumption reduction achieved by using the STT-MRAM.

As described above, it is possible to increase the cache capacity and to improve the efficiency of data transfer by using a next-generation memory or a non-volatile memory such as a STT-MRAM as the cache memory. In addition, it is possible to effectively reduce the power consumption by using the STT-MRAM when the data transfer ratio of the read port with respect to the write port is high.

Fourth Embodiment

The precedent process 200 may be a sensing device such as an imaging sensor. For example, the imaging sensor often transmits imaging data in a simple raster scan order. Furthermore, the subsequent process 230 may be an image quality improvement process on imaging data. With the above embodiments, it is possible to execute scan order conversion for using a tile-by-tile basis image process which enables memory saving, and to control an overlap region in a filter processing. Furthermore, in the above embodiments, the precedent process 220 may perform simple data transmission, and the subsequent process 230 can control the synchronization information to realize data reception operations in a variety of methods. Thus, the above embodiments can be employed in a case where a sensing device such as an imaging sensor simply transmits data to the shared cache I/F, and the subsequent process 230 which performs complex image processing receives the data in accordance with its function and operation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2019-037772, filed Mar. 1, 2019, and 2020-022672, filed Feb. 13, 2020, which are hereby incorporated by reference herein in their entirety.

What is claimed is:

1. An interface apparatus configured to provide a shared cache for a plurality of processing units, comprising:
   a first port configured to acquire data from a first processing unit included in the plurality of processing units;
   a second port configured to output the data acquired from the first processing unit to a second processing unit included in the plurality of processing units;
   a cache configured to cache the data acquired from the first processing unit; and
   a controller configured to control, based on information acquired from the second processing unit and information acquired from the first processing unit, whether to discard the data written in the cache and acquired from the first processing unit without writing back the data written in the cache and acquired from the first processing unit to a memory different from the cache.

2. The interface apparatus according to claim 1, wherein
   the first port is further configured to acquire respective data included in a data group in a first order from the first processing unit, and
   the second port is further configured to output respective data included in the data group in a second order different from the first order to the second processing unit.

3. The interface apparatus according to claim 1, wherein the information acquired from the second processing unit indicates whether it is unnecessary to write back data requested by the second processing unit from the cache to the memory.

4. The interface apparatus according to claim 1, wherein the controller is further configured to control, further based on information acquired from the first processing unit, whether to write back the data written in the cache to the memory.

5. The interface apparatus according to claim 4, wherein the information acquired from the first processing unit indicates whether the data will be transferred to the second processing unit.

6. The interface apparatus according to claim 4, wherein the controller is further configured to store, in association with the data written in the cache, one of the information acquired from the first processing unit, the information acquired from the second processing unit, or an operation result of the information acquired from the first processing unit and the information acquired from the second processing unit.

7. The interface apparatus according to claim 4, wherein the controller discards the data written in the cache without writing back the data to the memory, in response to:
   the data written in the cache being not acquired from the memory;
   the information acquired from the first processing unit indicating that the data will be transferred to the second processing unit; and
   the information acquired from the second processing unit indicating that it is unnecessary to write back the data requested by the second processing unit from the cache to the memory.

8. The interface apparatus according to claim 1, wherein the controller is further configured to, when discarding the data written in the cache, control whether to write back the data to be discarded based on at least the information acquired from the second processing unit.

9. The interface apparatus according to claim 1, wherein the cache is configured as a fully associative cache.

10. The interface apparatus according to claim 1, wherein the memory comprises a DRAM.

11. The interface apparatus according to claim 1, wherein the data comprises image data.

12. The interface apparatus according to claim 1, further comprising a first chip on which the first port, the second port, the cache, the controller, and the second processing unit are mounted, wherein the first chip is connected to the first processing unit mounted on a second chip different from the first chip.

13. A data processing apparatus comprising:
   a first processing unit;
   a second processing unit; and
   an interface apparatus configured to provide a shared cache for the first processing unit and the second processing unit, the interface apparatus comprising:
      a first port configured to acquire data from the first processing unit;
      a second port configured to output the data acquired from the first processing unit to the second processing unit;
      a cache configured to cache the data acquired from the first processing unit; and
      a controller configured to control, based on information acquired from the second processing unit and information acquired from the first processing unit, whether to discard the data written in the cache and acquired from the first processing unit without writing back the data written in the cache and acquired from the first processing unit to a memory different from the cache.

14. The data processing apparatus according to claim 13, wherein
the first processing unit is configured to generate a data group by a first data process on input data, and
the second processing unit is configured to perform a second data process on the data group, thereby generating a process result obtained by performing the first data process and the second data process on the input data.

15. The data processing apparatus according to claim 13, wherein
the first processing unit is further configured to transmit respective data of a plurality of tile regions with a first size to the interface apparatus in a tile-by-tile basis, wherein the plurality of tile regions with the first size are set in an image, and the second processing unit is further configured to receive respective data of a plurality of tile regions with a second size from the interface apparatus in a tile-by-tile basis, wherein the plurality of tile regions with the second size are set in the image, and the second size is different from the first size.

16. The data processing apparatus according to claim 13, wherein the second processing unit is further configured to determine, when requesting data to the interface apparatus, whether to request the data again in a subsequent process, and to transmit to the interface apparatus, in response to determining not to request the data again, information indicating that it is unnecessary to write back the requested data from the cache to the memory.

17. The data processing apparatus according to claim 13, wherein
the second processing unit is further configured to
receive respective data of a plurality of tile regions in a tile-by-tile basis from the interface apparatus, wherein the plurality of tile regions set in an image, and
control, when requesting data of the tile region to the interface apparatus, information indicating whether it is necessary to write back the data requested by the second processing unit from the cache to the memory in accordance with whether the data is included in another tile region, wherein the information indicating whether it is necessary to write back the data is to be transmitted to the interface apparatus.

18. The data processing apparatus according to claim 13, further comprising a network and the memory connected to the network,
wherein the data processing apparatus is connected to the network, and
the data processing apparatus is connected to the first processing unit and the second processing unit through respective paths other than the network.

19. A caching control method, at an interface apparatus, for providing a shared cache for a plurality of processing units, wherein the interface apparatus comprises a first port configured to acquire data from a first processing unit included in the plurality of processing units, a second port configured to output the data acquired from the first processing unit to a second processing unit included in the plurality of processing units, and a cache configured to cache the data acquired from the first processing unit, the method comprising
controlling, based on information acquired from the second processing unit and information acquired from the first processing unit, whether to discard the data written in the cache and acquired from the first processing unit without writing back the data written in the cache and acquired from the first processing unit to a memory different from the cache.

20. A non-transitory computer-readable medium storing a program which, when executed by a computer, which comprises a processor and a memory, of an interface apparatus, which is configured to provide a shared cache for a plurality of processing units and comprises a first port configured to acquire data from a first processing unit included in the plurality of processing units, a second port configured to output the data acquired from the first processing unit to a second processing unit included in the plurality of processing units, and a cache configured to cache the data acquired from the first processing unit, causes the computer to:
control, based on information acquired from the second processing unit and information acquired from the first processing unit, whether to discard the data written in the cache and acquired from the first processing unit without writing back the data written in the cache and acquired from the first processing unit to a memory different from the cache.

* * * * *